(12) United States Patent
Chassagne et al.

(10) Patent No.: US 10,407,516 B2
(45) Date of Patent: Sep. 10, 2019

(54) CRYSTALLINE HMO

(71) Applicant: Glycom A/S, Hørsholm (DK)

(72) Inventors: Pierre Chassagne, Beaumont (FR); Nikolay Khanzhin, Humlbæk (DK); Agnese Maggi, Allerød (DK)

(73) Assignee: GLYCOM A/S, Hørsholm (DK)

( * ) Notice: Subject to any disclaimer, the term of this patent is extended or adjusted under 35 U.S.C. 154(b) by 4 days.

(21) Appl. No.: 15/799,386

(22) Filed: Oct. 31, 2017

(65) Prior Publication Data

US 2018/0118855 A1 May 3, 2018

(30) Foreign Application Priority Data

Oct. 31, 2016 (DK) .................................. 2016 70857

(51) Int. Cl.
*C08B 37/00* (2006.01)
*A23L 33/125* (2016.01)
*A23L 33/00* (2016.01)

(52) U.S. Cl.
CPC .......... *C08B 37/006* (2013.01); *A23L 33/125* (2016.08); *A23L 33/40* (2016.08); *A23V 2002/00* (2013.01)

(58) Field of Classification Search
None
See application file for complete search history.

(56) References Cited

U.S. PATENT DOCUMENTS

2017/0204443 A1  7/2017  Baumgartner et al.

FOREIGN PATENT DOCUMENTS

| AU | 780290 B2 | 3/2005 | |
|---|---|---|---|
| WO | 2013044928 A1 | 4/2013 | |
| WO | WO-2014086373 A1 * | 6/2014 | ............... C07H 1/08 |
| WO | 2014153253 A1 | 9/2014 | |
| WO | 2015197082 A1 | 12/2015 | |
| WO | 2017182965 A1 | 10/2017 | |

OTHER PUBLICATIONS

Aly, M.R.E. et al., "Synthesis of Lacto-N-neohexaose and Lacto-N-neooctaose Using the Dimethylmaleoyl Moiety as an Amino Protective Group," Eur. J. Org. Chem., 2000, pp. 319-326.
Ashline, D.J. et al., "Structural Characterization by Multistage Mass Spectrometry (MSn) of Human Milk Glycans Recognized by Human Rotaviruses," Molecular & Cellular Proteomics, 2014, vol. 13(11), pp. 2961-2974.
Chen, X. (2015)."Human Milk Oligosaccharides (HMOS): Structure, Function, and Enzyme-Catalyzed Synthesis," Elsevier Inc. (vol. 72), Advances in Carbohydrate Chemistry and Biochemistry, pp. 113-190. http://dx.doi.org/10.1016/bs.accb.2015.08.002.
Di Virgilio, S. et al., "Enzymatic synthesis of natural and 13C enriched linear poly-N-acetyllactosamines as ligands or galectin-1," Glycobiology, 1999, vol. 9(4), pp. 353-364.
Gebus, C. et al., "Synthesis of alpha-galactosyl epitopes by metabolically engineered *Escherichia coli*," Carbohydrate Research, 2012, vol. 361, pp. 83-90.
Pöhner, C. et al., "Chemoselective coupling of sugar oximes and alpha-ketoacids to glycosyl amides and N-glycopeptides," Tetrahedron Letters, 2014, vol. 55, pp. 2197-2200.
Priem, B. et al., "A new fermentation process allows large-scale production of human milk oligosaccharides by metabolically engineered bacteria," Glycobiology, 2002, vol. 12(4), pp. 235-240.
Shimizu, H. et al., "Solid Phase Synthesis of Polylactosamine Oligosaccharide," Bioorganic & Medicinal Chemistry Letters, 1996, vol. 6(23), pp. 2841-2846.
Urashima, T. et al. (2011) Nutrition and Diet Research Progress: Milk Oligosaccharides. New York: Nova Science Publishers, Inc.
Yu, Y. et al., "Human Milk Contains Novel Glycans That Are Potential Decoy Receptors for Neonatal Rotaviruses," Molecular & Cellular Proteomics, 2014, vol. 13(11), pp. 2944-2960.

* cited by examiner

*Primary Examiner* — Layla D Berry
(74) *Attorney, Agent, or Firm* — Neal, Gerber & Eisenberg LLP (57) ABSTRACT

Crystalline pLNnH, useful in a pharmaceutical or nutritional composition, is disclosed.

20 Claims, 5 Drawing Sheets

CRYSTALLINE HMO

CROSS-REFERENCE TO RELATED APPLICATIONS

This application claims priority to Denmark Patent Application No. PA 2016 70857, filed on Oct. 31, 2016, the contents of which are fully incorporated herein by reference.

FIELD OF THE INVENTION

This invention relates to a crystalline human milk oligosaccharide (HMO), notably the hexasaccharide pLNnH (para-lacto-N-neohexaose, Galβ1-4GlcNAcβ1-3Galβ1-4GlcNAcβ1-3Galβ1-4Glc) in crystalline form and a method of obtaining it in the biotechnical production of LNnT (lacto-N-neotetraose).

BACKGROUND OF THE INVENTION

In recent years, efforts have increasingly been made to produce industrially complex carbohydrates, such as secreted oligosaccharides. This has been due to the roles of such compounds in numerous biological processes in living organisms. Secreted oligosaccharides, such as human milk oligosaccharides (HMOs), have become particularly important commercial targets for nutrition and therapeutic applications. Human milk oligosaccharides have become of great interest in the past few years due to their important functions in human development. To date, the structures of more than 140 HMOs have been determined, and considerably more are probably present in human milk (Urashima et al.: *Milk oligosaccharides*, Nova Science, 2011; Chen *Adv. Carbohydr. Chem. Biochem.* 72, 113 (2015)).

To date, ways of making large volumes of human milk oligosaccharides at low cost have not been available. The isolation of oligosaccharides from human milk has been rather difficult, even in milligram quantities, and very expensive due to the presence of a large number of other similar oligosaccharides in human milk. This problem has not been solved by current biotechnology or synthetic chemistry technology with regard to higher HMOs. Because of the growing commercial interest in nutritional compositions and supplements containing HMOs, there has been a need for a low cost method of making such HMOs.

Para-lacto-N-neohexaose (pLNnH) was proposed to be a core HMO, the sialylated and/or fucosylated derivatives of which are mother milk components ((Urashima et al.: *Milk oligosaccharides*, Nova Science, 2011). Recently, pLNnH itself has been shown to be present in human milk (Yu et al. *Mol. Cell. Proteom.* 13, 2944 (2014), Ashline et al. *Mol. Cell. Proteom.* 13, 2961 (2014)).

The chemical synthesis of pLNnH has been disclosed by Shimizu et al. (*Bioorg. Med. Chem. Lett.* 6, 2841 (1996)), by Ali et al. (*Eur. J. Org. Chem.* 319 (2000)) and in WO 2013/044928. The in vitro enzymatic synthesis of pLNnH has been described by Di Virgilio et al. (*Glycobiology* 9, 353 (1999)). The one-cell biosynthesis of pLNnH, together with LNnT and other higher oligosaccharides, has been reported in WO 01/04341, by Priem et al. (*Glycobiology* 12, 235 (2002)) and by Gebus et al. (*Carbohydr. Res.* 361, 83 (2012)).

Crystalline HMOs, produced in industrial amounts, are highly desirable for food and medical applications. However, no crystalline form of pLNnH has, as yet, been described. In addition, the above prior art methods are not suitable for scaling-up and industrial production of pLNnH.

Crystallization or recrystallization is one of the simplest and cheapest methods to separate a chemical product from contaminants and obtain it in pure form. In addition, crystalline modifications of a solid compound are important in the development of a compound, because different crystalline forms or polymorphs can have different properties—for example its thermodynamic stability, solubility, density and hygroscopicity.

SUMMARY OF THE INVENTION

The first aspect of the invention relates to different crystalline modifications of para-lacto-N-neohexaose (pLNnH).

The second aspect of the invention relates to methods for producing the different crystalline pLNnH polymorphs.

The third aspect of the invention relates to a nutritional composition containing a crystalline pLNnH according to the present invention.

The fourth aspect of the invention relates to the use of a crystalline pLNnH according to the present invention in preparing a nutritional composition.

The fifth aspect of the invention relates to a crystalline pLNnH according to the present invention for use as a pharmaceutically active ingredient.

The sixth aspect of the invention relates to a pharmaceutical composition containing a crystalline pLNnH according to the present invention.

BRIEF DESCRIPTION OF THE FIGURES

The invention will be described in further detail hereinafter with reference to the accompanying figures, in which.

DETAILED DESCRIPTION OF THE INVENTION

This invention provides pLNnH as a crystalline material.

Figure 1:
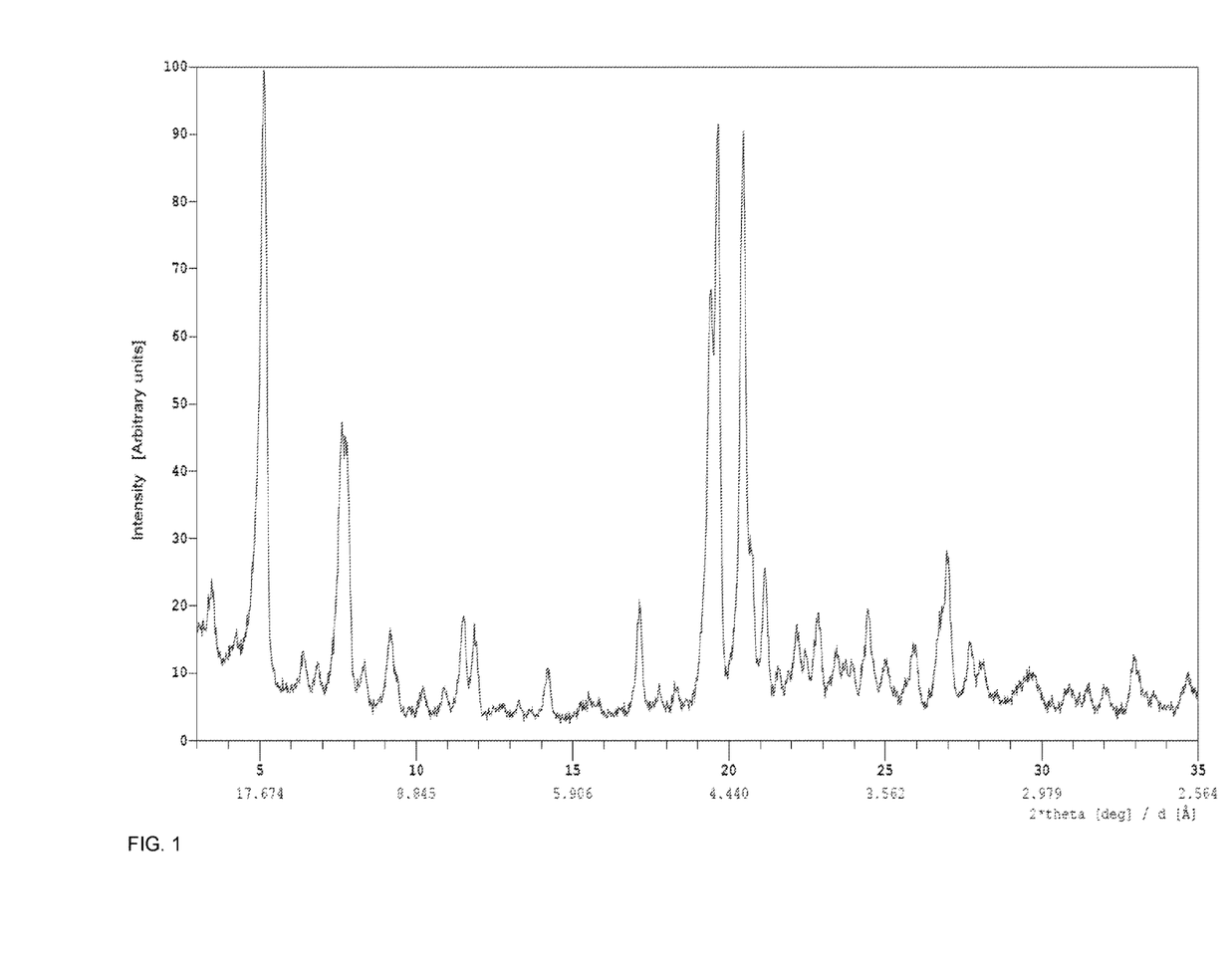
FIG. 1 shows the powder X-ray diffraction pattern of the crystalline pLNnH polymorph A sample obtained according to Example 1 or 2.

In one embodiment, a crystalline pLNnH of this invention, designated as polymorph A, has powder X-ray diffraction reflections, based on a measurement using CuKα radiation, at 5.09±0.20, 19.60±0.2 and 20.40±0.20, preferably at 5.09±0.20, 19.60±0.2, 20.40±0.20 and 19.38±0.2, more preferably at 5.09±0.20, 19.60±0.2, 20.40±0.20, 19.38±0.2 and 7.58±0.2, even more preferably at 5.09±0.20, 19.60±0.2, 20.40±0.20, 19.38±0.2, 7.58±0.2 and 7.72±0.2, particularly at 5.09±0.20, 19.60±0.2, 20.40±0.20, 19.38±0.2, 7.58±0.2, 7.72±0.2 and 26.94±0.2, or 5.09±0.20, 19.60±0.2, 20.40±0.20, 19.38±0.2, 7.58±0.2, 7.72±0.2, 26.94±0.2 and 21.11 2Θ angles. The PXRD pattern is shown in FIG. 1 and the list of peaks of the PXRD pattern of the crystalline pLNnH is set forth in Table 1, below.

TABLE 1

| 2Θ [deg] | rel. intensity (%) |
|---|---|
| 3.44 | 9 |
| 4.56 | 8 |
| 5.09 | 100 |
| 6.34 | 7 |
| 7.58 | 44 |
| 7.72 | 41 |
| 8.30 | 7 |
| 9.12 | 13 |
| 11.48 | 16 |
| 11.84 | 12 |
| 14.15 | 8 |
| 17.09 | 17 |
| 19.38 | 66 |
| 19.60 | 93 |
| 20.40 | 87 |
| 20.66 | 23 |
| 21.11 | 19 |
| 22.12 | 9 |
| 22.38 | 6 |
| 22.80 | 12 |
| 23.39 | 6 |
| 24.38 | 14 |
| 25.92 | 9 |
| 26.70 | 13 |
| 26.94 | 23 |
| 27.66 | 9 |
| 28.06 | 6 |
| 32.92 | 9 |

The crystalline pLNnH polymorph A of this invention, preferably, contains water of hydration in around 4.8-9.4%.

Figure 2:
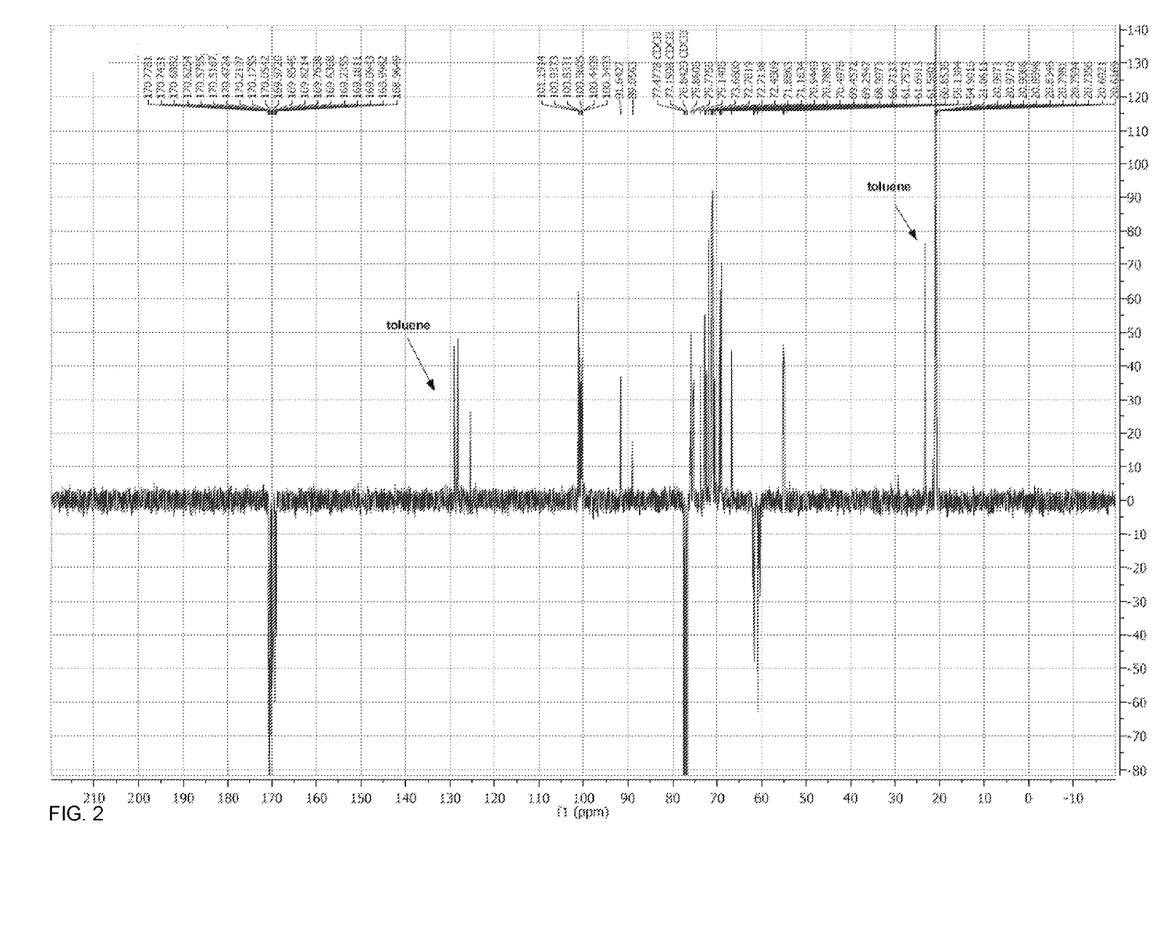
FIG. 2 shows the $^{13}$C-NMR spectrum of pLNnH peracetate.

In another embodiment, a crystalline pLNnH of this invention, designated as polymorph B, has powder X-ray diffraction reflections, based on a measurement using CuKα radiation, at 19.42±0.20 and 10.07±0.2, preferably at 19.42±0.20, 10.07±0.20 and 19.88±0.20, more preferably at 19.42±0.20, 10.07±0.20, 19.88±0.20 and 21.25±0.2, most preferably at 19.42±0.20, 10.07±0.20, 19.88±0.20, 21.25±0.20 and 18.88±0.2, particularly at 19.42±0.20, 10.07±0.20, 19.88±0.20, 21.25±0.20, 18.88±0.20 and 27.52 2Θ angles. The PXRD pattern is shown in FIG. 2 and the list of peaks of the PXRD pattern of the crystalline pLNnH is set forth in Table 2, below.

TABLE 2

| 2Θ [deg] | rel. intensity (%) |
|---|---|
| 8.33 | 4 |
| 9.12 | 4 |
| 10.07 | 51 |
| 10.92 | 8 |
| 11.08 | 7 |
| 12.69 | 7 |
| 16.65 | 10 |
| 17.17 | 6 |
| 18.32 | 4 |
| 18.88 | 26 |
| 19.42 | 100 |
| 19.88 | 34 |
| 21.25 | 28 |
| 22.48 | 6 |
| 23.08 | 4 |
| 24.16 | 6 |
| 24.64 | 5 |
| 25.10 | 4 |
| 25.47 | 4 |
| 26.70 | 5 |
| 27.12 | 5 |
| 27.52 | 16 |
| 28.08 | 4 |

Figure 3:
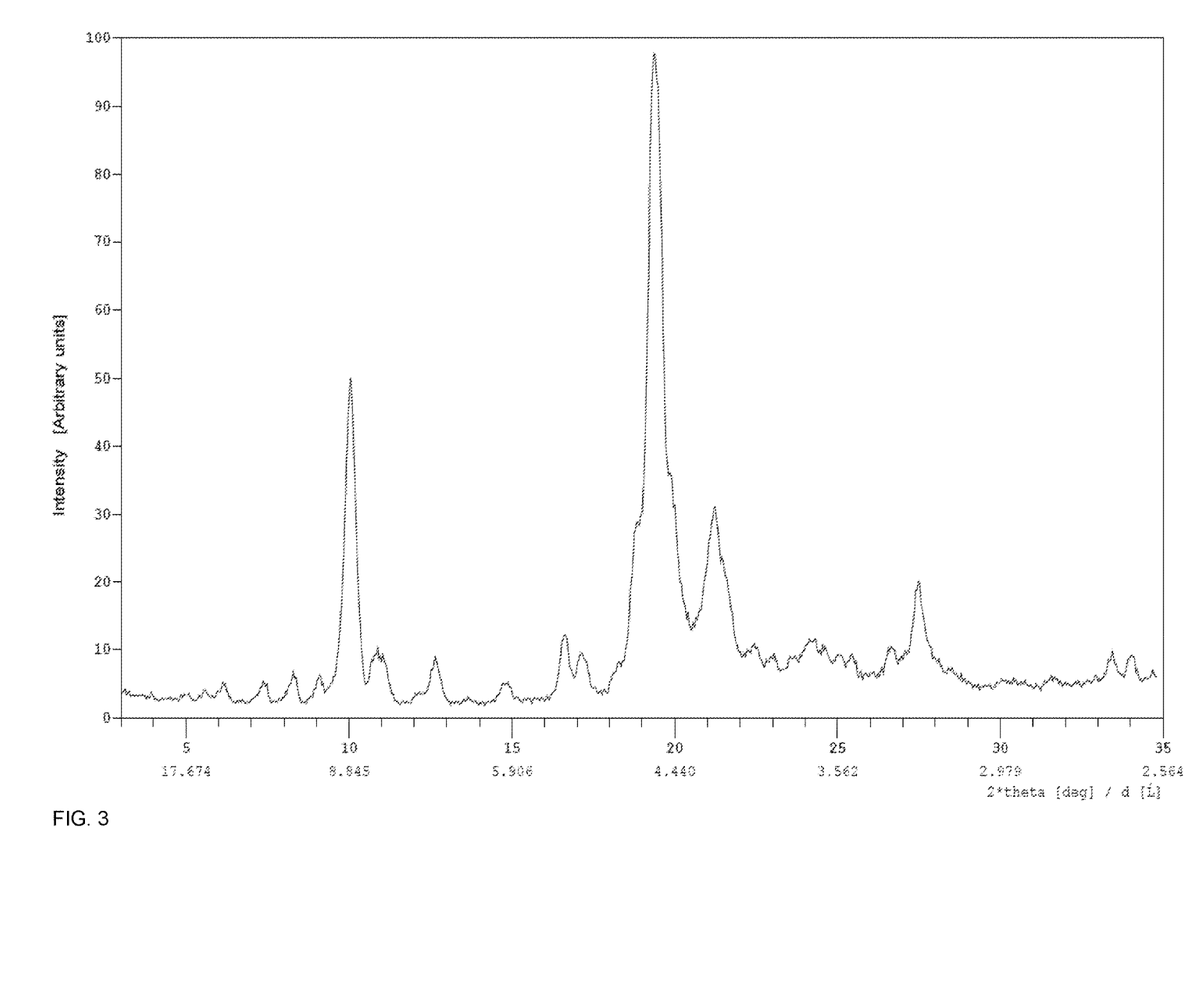
FIG. 3 shows the powder X-ray diffraction pattern of the crystalline pLNnH polymorph B sample obtained according to Example 3.

Yet in another embodiment, a crystalline pLNnH of this invention, designated as polymorph C, has powder X-ray diffraction reflections, based on a measurement using CuKα radiation, at 19.55±0.20 and 9.47±0.2, preferably at 19.55±0.20, 9.47±0.20 and 6.84±0.20, more preferably at 19.55±0.20, 9.47±0.20, 6.84±0.20 and 19.06±0.20, most preferably at 19.55±0.20, 9.47±0.20, 6.84±0.20, 19.06±0.20 and 16.60±0.2, particularly at 19.55±0.20, 9.47±0.20, 6.84±0.20, 19.06±0.20 and 16.60±0.2 and 6.10 2Θ angles. The PXRD pattern is shown in FIG. 3 and the list of peaks of the PXRD pattern of the crystalline pLNnH is set forth in Table 3, below.

TABLE 3

| 2Θ [deg] | rel. intensity (%) |
|---|---|
| 6.10 | 10 |
| 6.84 | 13 |
| 9.47 | 57 |
| 16.60 | 10 |
| 18.48 | 4 |
| 19.06 | 11 |
| 19.55 | 100 |
| 20.04 | 8 |
| 20.56 | 4 |
| 21.17 | 9 |
| 21.76 | 6 |
| 22.91 | 4 |
| 23.48 | 4 |
| 23.80 | 4 |
| 25.48 | 4 |
| 26.64 | 9 |
| 27.40 | 4 |
| 27.56 | 5 |

The crystalline pLNnH polymorph C of this invention, preferably, contains around 6 mols of crystalline water.

Preferably, any of the crystalline pLNnH polymorphs defined above is substantially pure. The term "substantially pure" preferably means herein that the crystalline pLNnH contains less than 10 w/w %, such as less than 5 w/w %, less than 2.5 w/w %, less than 1 w/w %, or less than 0.5 w/w %, of impurities. The term "impurities" preferably means herein any physical entities different from the crystalline pLNnH and its water of hydration, such as an amorphous pLNnH, by-products, e.g. LNnT or lacto-N-triose from the synthesis of pLNnH, degradation products, inorganic salts and/or other contaminants.

Any of the crystalline pLNnH polymorphs defined above can be an anomeric mixture of α- and β-anomers or a pure form of one of the anomers.

Any of the crystalline pLNnH polymorphs of this invention defined above, taken as a single crystalline modification or a mixture or two or three polymorphs, is suitable for nutritional use. Nutritional compositions, such as foods, drinks or feeds, for such use can contain the crystalline pLNnH as an active ingredient, together with other edible micronutrients, vitamins and minerals. The amounts of such ingredients can vary depending on the target group of users, that is whether the nutritional compositions are intended for use with animals, e.g. pets like dogs or cats, or humans, e.g. normal, healthy infants, children, adults or subjects having specialized needs (e.g. suffering from metabolic disorders). Micronutrients include, for example, edible oils, fats or fatty acids (such as coconut oil, soy-bean oil, monoglycerides, diglycerides, palm olein, sunflower oil, fish oil, linoleic acid, linolenic acid etc.), carbohydrates (such as glucose, fructose, sucrose, maltodextrin, starch, hydrolysed cornstarch, etc.) and proteins from casein, soy-bean, whey or skim milk, or hydrolysates of these proteins, but protein from other sources (either intact or hydrolysed) can be used as well.

Vitamins A, B1, B2, B5, B6, B12, C, D, E, H, K, folic acid, inositol and nicotinic acid and minerals and trace elements, such as Ca, P, K, Na, CI, Mg, Mn, Fe, Cu, Zn, Se, Cr and I, can also be used.

An example of nutritional compositions containing the crystalline pLNnH is an infant formula, i.e., a foodstuff intended for use by infants during their first 4-6 months of life and satisfying by itself their nutritional requirements. The infant formula can contain one or more probiotic *Bifidobacterium* species, prebiotics such as fructooligosaccharides and galactooligosaccharides, proteins from casein, soy-bean, whey or skim milk, carbohydrates such as lactose, saccharose, maltodextrin, starch or mixtures thereof, lipids (e.g. palm olein, sunflower oil, safflower oil) and vitamins and minerals essential in a daily diet. The infant formula preferably contains 0.1-3.0 g of the crystalline pLNnH/100 g of the infant formula.

Any of the crystalline pLNnH polymorphs described above, taken as a single crystalline modification or a mixture or two or three polymorphs, can also be used as a food supplement. The food supplement can also contain other active ingredients, such as one or more probiotics, vitamins, minerals, trace elements and other micronutrients. The food supplement can be for example in the form of tablets, capsules, pastilles or a liquid and contain conventional additives such as binders, coatings, emulsifiers, solubilising agents, encapsulating agents, film forming agents, adsorbents, carriers, fillers, dispersing agents, wetting agents, jellifying agents and gel forming agents. The daily dose of pLNnH can range from 0.1 to 3.0 g.

Any of the crystalline pLNnH described above, taken as a single crystalline modification or a mixture or two or three polymorphs, is further suitable for use as an active ingredient in the preparation of nutritional compositions including foods, drinks and feeds, such as food supplements. The nutritional compositions can be prepared in a conventional manner, for example by admixing micronutrient components in appropriate proportions, then adding vitamins and minerals. To avoid thermal degradation or decomposition, heat sensitive vitamins can be added after homogenization. Lipophilic vitamins can be dissolved in a fat source before mixing. A liquid mixture can be made by mixing the desired ingredients with water, the temperature of which is preferably about 50-80° C. to help dissolution or dispersal of the ingredients. The crystalline pLNnH polymorph can then be added. The resulting mixture can then be homogenized by flash heating to about 80-150° C. by steam injection, heat exchanger or autoclave. This thermal treatment also reduces significantly the bacterial loads. The hot mixture can then be cooled rapidly to about 60-80° C. If needed, further homogenization can be carried out at this temperature under high pressure of about 2-30 MPa. After cooling, heat sensitive constituents can then be added, and the pH and the content of the solids can be conveniently adjusted. The resulting mixture is then dried to a powder by, for example, conventional spray drying or freeze drying methods. Probiotics can then be added by dry-mixing.

Any of the crystalline pLNnH polymorph of this invention described above, taken as a single crystalline modification or a mixture or two or three polymorphs, is also suitable for use as a pharmaceutical agent. Pharmaceutical compositions for such use can contain the crystalline pLNnH as an active ingredient and one or more conventional pharmaceutically acceptable carriers, as well as additives, adjuvants, excipients and diluents (water, gelatine, talc, sugars, starch, gum arabic, vegetable gums, vegetable oils, polyalkylene glycols, flavouring agents, preservatives, stabilizers, emulsifying agents, lubricants, colorants, fillers, wetting agents, etc.) as described in the standard reference text, Remington's Pharmaceutical Sciences. The amounts of such ingredients can vary depending on whether the pharmaceutical compositions are intended for use with infants, children or adults or subjects having specialized needs.

One aspect of this invention relates to a method for crystallising pLNnH polymorph A defined above from water or an aqueous solution. Accordingly, the invention provides a process A1 for obtaining the crystalline pLNnH polymorph A by crystallizing it from water. The crystallization process comprises the steps of:

a) providing an aqueous solution or suspension of pLNnH between 40 and 80° C. having a concentration of 35-60 wt %,
  b) allowing the solution or suspension obtained in step a) to cool, preferably to room temperature, and
  c) collecting and drying pLNnH polymorph A crystals which precipitate from the mixture during step b).

In one embodiment, seeding may be applied in step b) to assist or initiate crystallization. Whether or not seeding is necessary for crystallizing out pLNnH polymorph A depends on the relative purity of pLNnH in the crystallization mixture and/or its concentration in the crystallizing solution. The utilization of seeding crystals is preferable in step b) wherein pLNnH polymorph A to be crystallized is contaminated by organic substance(s), for example carbohydrate(s) that are prone to co-crystallize with pLNnH. By addition of seeding crystal, the co-crystallization of the carbohydrate contamination(s) from the crystallization mixture is avoidable and the crystallization of pLNnH polymorph A in high purity is possible. However, when the crude pLNnH is relatively pure, self-nucleation occurs often and pLNnH polymorph A is then obtainable without seeding.

In the process A1 disclosed above, the crystallization milieu is pure water. The term "pure" in this context means that water does not contain any other solvent. The higher the temperature of the aqueous solution of pLNnH provided in step a), higher concentration of dissolved pLNnH in the form of a clear solution can be achieved. In one embodiment, the concentration of the aqueous solution of pLNnH provided in step a) is saturated or close to saturation. The temperature is set to at least 40° C., for example around 50° C., 60° C. or 70° C. It is within the skilled person's ambit to determine the maximum solubility of pLNnH in water at these temperatures.

In certain embodiments, the dissolution of pLNnH in water between 40-80° C. at a concentration of 35-60 wt % may result in a suspension.

Preferably, an aqueous pLNnH solution of about 43-50 w/w % at about 60-70° C. is provided in step a). In other particular embodiment, a certain concentration of the pLNnH solution provided in step a) can be set e.g. by making a more diluted solution at lower temperature and either further pLNnH is added to the solution while raising its temperature, or water is evaporated from the solution, advantageously under reduced pressure. In one embodiment, crude pLNnH dissolved in pure water to make a 10-20 w/w % solution which is concentrated to around 50 w/w % at around 70° C. and 40-100 mbar, then the warm solution or suspension is allowed to cool to room temperature at atmospheric pressure under continuous stirring in 6-24 hours.

Moreover, the invention provides a process A2 for obtaining the crystalline pLNnH polymorph A by crystallizing it from a mixture of water and a water miscible organic solvent. The crystallization process comprises the steps of:

a) providing a solution of pLNnH in a mixture of 3-15 volumes water and 3-30 volumes water miscible organic solvent between 40 and 80° C.,
b) allowing it to cool, preferably to room temperature, and
c) collecting and drying pLNnH polymorph A crystals which precipitate from the mixture during step b).

Examples of water miscible solvents that are suitable for crystallizing pLNnH polymorph A according to process A2 above include lower alcohols and ketones such as acetone and methyl ethyl ketone. Lower alcohols are preferably $C_1$-$C_4$ alcohols such as methanol, ethanol, n-propanol, i-propanol, n-butanol, i-butanol, s-butanol and t-butanol and mixtures thereof, most preferably methanol.

One embodiment of this process A2 comprises the steps of:
a) providing a solution of pLNnH in a mixture of 10-15 volumes water and 10-15 volumes water miscible organic solvent between 40 and 80° C.,
b) allowing it to cool to room temperature, and
c) collecting and drying pLNnH polymorph A crystals which precipitate from the mixture during step b).

In one embodiment, pLNnH, provided in crude, syrupy or amorphous form, to be crystallized, is dissolved in 10-15 volumes of water (that is, 1 g of pLNnH is dissolved in 10-15 ml of water), to which, preferably at 40-80° C., the same volume of a lower alcohol, advantageously methanol, is added at the same temperature to give a clear solution. This solution is allowed to cool to room temperature while stirring, which is continued for 6-24 hours, in step b). In some embodiments, addition of seed crystals in step b) may assist crystallization.

Another embodiment of the present invention relates to a method for crystallizing pLNnH polymorph B, designated as process B. In process B, an aqueous solution of pLNnH is gently heated for 1-5 days until water slowly evaporates leaving behind a crystalline mass of pLNnH polymorph B. Accordingly, process B comprises the steps of:
a) providing an aqueous solution of pLNnH at room temperature, and
b) evaporating the water off at 40-70° C. in 1-5 days.

In this process B of crystallizing pLNnH, the crystallization milieu is pure water. In step a) of process B, the concentration of the pLNnH solution may vary in a broad range as long as the mixture remains a solution. Typically, the concentration of pLNnH is not more than 1 M, preferably is around 0.25-0.5 M. In step b), during water removal, the solution spontaneously inoculates at a certain point of time and the solution becomes a suspension. Water removal is continued until the suspension loses the vast majority of water, practically all of it, and the remaining solid is a crystalline block or an easily flowing crystalline powder.

Yet another embodiment of the present invention is producing crystalline pLNnH polymorph C, comprising the step of subjecting crystalline pLNnH polymorph B to ambient humidity until constant weight. Freshly prepared crystalline pLNnH polymorph B changes crystal modification while taking up water from air. Ambient humidity is typically of around 30-60% relative humidity, however the more humid the air the more quickly polymorph B converts to polymorph C. In general, the phase transformation occurs in a couple of hours, e.g. in 4-5 hours.

pLNnH to be crystallized can be readily obtained by a process, which involves culturing or fermenting a genetically modified cell in an aqueous culture medium or fermentation medium containing lactose and one or more carbon-based substrates followed by separating it from the culture medium. By the term "culture medium" is meant the aqueous environment of the fermentation process in a fermenter outside of the genetically modified cell.

By the term "genetically modified cell" is preferably meant a cell in which at least one DNA sequence has been added to, deleted from or changed in the cell's genome, so that the cell has a changed phenotype. This change in phenotype alters the characteristics of the genetically modified cell from that of the wild type cell. Thus, the genetically modified cell can perform at least an additional chemical transformation, when cultured or fermented, due to the added or changed DNA that encodes the expression of at least one enzyme not found in the wild type cell, or the genetically modified cell cannot perform a chemical transformation due to the deleted, added or changed DNA that encodes the expression of an enzyme found in the wild type cell. The genetically modified cell can be produced by conventional genetic engineering techniques. The genetically modified cell can be a bacteria or yeast but preferably is a bacterium. Preferred bacteria include *Escherichia coli*, *Bacillus* spp. (e.g. *B. subtilis*), *Campylobacter pylori*, *Helicobacter pylori*, *Agrobacterium tumefaciens*, *Staphylococcus aureus*, *Thermophilus aqualicus*, *Azorhizobium caulinodans*, *Rhizobium leguminosarum*, *Neisseria gonorrhoeae*, *N. meningitis*, *Lactobacillus* spp., *Lactococcus* spp., *Enterococcus* spp., *Bifidobacterium* spp., *Sporolactobacillus* spp., *Micromomospora* spp., *Micrococcus* spp., *Rhodococcus* spp., *Pseudomonas*, particularly *E. coli*.

Specifically, the genetically modified cell capable of producing pLNnH contains:
a first recombinant gene encoding a β1,3-N-acetyl-glucosaminyl transferase which is able to transfer a GlcNAc of a UDP-GlcNAc to lactose and thereby to form LNTri II in the cell, and
a second recombinant gene encoding a β1,4-galactosyl transferase which is able to transfer a galactosyl residue from a UDP-Gal to LNTri II thereby to form LNnT in the cell.

The genetically modified cell above, when cultured in an aqueous culture medium containing lactose, can internalize the lactose and then transfer a GlcNAc residue of an activated sugar nucleotide in the cell to the internalized lactose to form LNTri II in the cell. The cell can also transfer a galactosyl residue of an activated sugar nucleotide in the cell to the previously formed LNTri II in the cell to form LNnT in the cell. In addition, the LNnT so formed may be an acceptor for a second GlcNAc transfer by the β1,3-N-acetyl-glucosaminyl transferase whereby the pentasaccharide GlcNAc-LNnT is produced, to which the 1,4-galactosyl transferase may carry a further Gal residue to form pLNnH. As a consequence, LNnT is a main product and pLNnH is a by-product. The recombinant genes or the equivalent DNA sequences responsible for these transfers can be introduced into the cell in a well-known manner, using conventional expression vectors. The origin of these heterologous nucleic acid sequences can be any bacteria, e.g. from *N. meningitidis* or *H. pylori*.

In carrying out this process, the genetically modified cell is cultured in the presence of a carbon-based substrate such as glycerol, glucose, sucrose, glycogen, fructose, maltose, starch, cellulose, pectin, chitin, etc. Preferably, the cell is cultured with glycerol, glucose, sucrose and/or fructose.

This process also involves initially transporting the exogenous lactose from the culture medium into the genetically modified cell. Lactose can be added exogenously in a conventional manner to the culture medium, from which it can then be transported into the cell. The internalization of lactose should not, of course, affect the basic and vital functions or destroy the integrity of the cell. The internalization can take place via a passive transport mechanism during which lactose diffuses passively across the plasma membrane of the cell. The flow is directed by the concentration difference in the extra- and intracellular space with respect to lactose to be internalized, so that lactose passes from the place of higher concentration to the place of lower concentration. However, lactose is preferably internalized in the cell with the aid of an active transport mechanism, by which lactose diffuses across the plasma membrane of the cell under the influence of a transporter protein or lactose permease (LacY) of the cell.

The genetically modified cell used in this process lacks enzymatic activity which would significantly degrade lactose, LNnT, LNTri II, pLNnH, and the metabolic intermediates needed to make LNnT, LNTri II and pLNnH in the cell. In this regard, the native β-galactosidase of the culturing cell (encoded by the LacZ gene in $E.\ coli$), which hydrolyses lactose to galactose and glucose, is preferably deleted or inactivated (LacZ$^-$ genotype).

A preferred genetically modified cell has a LacZ$^-$, particularly a LacZ$^-$, LacY$^+$, more particularly a LacZ$^-$, LacY$^+$, LacI$^-$ genotype.

Further examples of LNnT producing strains are disclosed in e.g. Priem et al. Glycobiology 12, 235 (2002), Gebus et al. *Carbohydr. Res.* 361, 83 (2012), WO 01/04341, WO 2014/153253, WO 2015/197082 or WO 2016/008602.

A possible way to carry out the fermentation to produce LNnT accompanied by pLNnH is when a genetically modified LacZ$^-$Y$^+$ $E.\ coli$ strain is cultured comprising:

(1) a first phase of exponential cell growth that is ensured by a carbon-based substrate, preferably glucose, provided in the culture medium and that preferably lasts until the glucose has all been consumed which is preferably at least 12 hours, more preferably at least 18 hours, still more preferably 20-25 hours, up to about 48 hours; and (2) a second phase of cell growth that is limited by a carbon-based substrate, preferably glycerol, and lactose which are provided, preferably continuously, in the culture medium after the first phase and that lasts until the glucose and preferably most (e.g. at least 60%) of the lactose have been consumed which is preferably at least 35 hours, more preferably at least 45 hours, still more preferably 50 to 70 hours, up to about 130 hours.

The LNnT-pLNnH product mixture, which is transported from the cell to the aqueous culture medium, contains a predominant amount of LNnT, and the pLNnH:LNnT weight ratio is not more than 0.4, advantageously is about 0.15 to 0.25. They can be separated from the cells and impurities in the culture medium by a method comprising at least one of the following separation steps:

ultrafiltration,
nanofiltration,
ion exchange treatment, or
active charcoal treatment, but preferably two or three of them, or all four steps, in any order. Advantageously, an ultrafiltration step is always comprised, preferably as the first separation step (that is applied on the fermentation broth), followed by nanofiltration, ion exchange treatment and/or active charcoal treatment.

A first separation step involves separating the aqueous culture medium, containing LNnT and pLNnH, from the cells, which have been cultured, and from suspended particulates and contaminants, insoluble materials and debris. In this step, the culture medium can be clarified in a conventional manner, for example by membrane filtration or centrifugation of the broth. The membrane filtration may be ultrafiltration (UF). The ultrafiltration step separates the biomass and, preferably, also high molecular weight suspended solids from the soluble components of the broth. An aqueous solution containing the produced LNnT and pLNnH, without substantially changing their relative weight ratios to each other, passes through the ultrafiltration membrane giving rise to the UF permeate (UFP).

Any conventional ultrafiltration membrane can be used having a molecular weight cut-off (MWCO) range between about 1 and about 500 kDa, such as 10-250, 50-100, 200-500, 100-250, 1-100, 1-50, 10-25, 1-5 kDa, any other suitable sub-ranges. The membrane material can be a ceramic or made of a synthetic or natural polymer, e.g. polysulfone, polypropylene, cellulose, cellulose acetate or polylactic acid. The ultrafiltration step can be applied in dead-end or cross-flow mode. This separation step may comprise more than one ultrafiltration step using membranes with different MWCO, e.g. using two ultrafiltration separations wherein the first membrane has a higher MWCO than that of the second membrane. This arrangement may provide a better separation efficacy of the higher molecular weight components of the broth. After this separation step the permeate contains materials that have a molecular weight lower than the MWCO of the second membrane, including LNnT and pLNnH in substantially the same range as before applying the UF step.

A second separation step comprises nanofiltration (NF). This nanofiltration step may advantageously be used to concentrate the previously obtained UFP and/or to remove ions, mainly monovalent ions, and organic materials having a molecular weight lower than that of lactose, such as monosaccharides. The nanofiltration membrane has a MWCO that ensures the retention of LNnT and pLNnH, that is its MWCO is lower than that of the ultrafiltration membrane(s) used in the previous step, and around 25-50% of the molecular weight of LNnT. In this regard LNnT and pLNnH are accumulated in the NF retentate (NFR), in substantially the same range as before applying the NF step. The nanofiltration can be combined with diafiltration with water in order to remove permeable molecules more effectively, e.g. until the conductivity of the permeate showing no or very low presence of salts.

A third separation step preferably involves removing any remaining minerals, salts and other charged molecules, as well as amino acids, from the remaining culture medium, preferably after the second separation step. This third separation step can be carried out in a conventional manner, using ion exchange resin(s), by passing the remaining culture medium through a cation exchange resin in H$^+$-form and/or an anion exchange resin in free base form. The cation exchange resin is preferably a strong exchanger, and the anion exchange resin is a weak exchanger. The ion exchange resins, besides removing salts and charged molecules from the remaining culture medium, can physically adsorb proteins, DNA and colorizing/caramel bodies.

A fourth separation step preferably involves removing any remaining colorizing/caramel bodies and/or water soluble contaminants, such as salts, from the remaining culture medium. This fourth step can be carried out in a conventional manner, using activated charcoal, to decolour the LNnT-pLNnH mixture obtained in a previous step. The active charcoal treatment may follow any of the ultrafiltration, nanofiltration or ion exchange treatment disclosed above, preferably the ion exchange treatment.

LNnT and pLNnH tend to be bound to the surface of charcoal particles from their aqueous solution, e.g. an aqueous solution obtained after UF, NF or ion exchange treatment. Similarly, the colorizing agents are also capable to be adsorbed to the charcoal. While the carbohydrates and colour giving materials are adsorbed, water soluble materials that are not or weaker bound to the charcoal can be eluted with water. By changing the eluent from water to aqueous ethanol, the adsorbed LNnT and pLNnH can easily be eluted and collected, the mixture having substantially the same relative weight ratios with regard to LNnT and pLNnH as before. The adsorbed colour giving substances would still remain adsorbed on the charcoal, thus both decolourization and desalination can be achieved simultaneously in this step.

A fifth (and optional) separation step may be a chromatography on a neutral solid phase, advantageously a reversed-phase chromatography. An aqueous solution comprising LNnT and pLNnH obtained in the fermentation process and/or after any of the separation steps disclosed above may contain small amounts of other soluble hydrophobic impurities which should be removed. The hydrophobic impurities are adsorbed and consequently retained, due to hydrophobic interactions with the hydrophobic ligands, such as alkyl or aryl side chains, of the gel matrix (resin) of the stationary neutral solid phase, while the more hydrophilic LNnT and pLNnH do not bind onto that solid medium and therefore can be eluted with an aqueous medium, preferably water, used as the mobile phase. During this fifth separation step, the weight ratios of LNnT to pLNnH do not change substantially.

The reversed-phase chromatography can be carried out in a conventional manner. Preferably, a hydrophobic chromatographic medium is used that is selected from the group consisting of: reversed-phase silicas and organic polymers, especially copolymers of styrene or divinylbenzene and methacrylate polymer. The silicas are preferably derivatized with straight chain alkyl hydrocarbons ranging in length from C1 to C18 (C1, C4, C5 C8 and C18 being the most common) or other hydrophobic ligands (for example phenyl or cyano).

To the aqueous medium used as the mobile phase in the reversed-phase chromatography an organic solvent may be added to alter its polarity, thereby to enhance the separation of oligosaccharides from more hydrophobic substances. Many organic solvents, preferably solvents miscible with water, can be used for this purpose, like lower alkanols, such as methanol, ethanol and isopropanol, or acetonitrile, or tetrahydrofuran, or acetone.

The chromatography on a neutral solid phase can also be a gel filtration chromatography. The method is based on the separation of the hexasaccharide pLNnH by size from the lower oligosaccharides LNnT. The gel filtration chromatography is conducted in a conventional manner, and provides separated fractions of LNnT and pLNnH. The separated pLNnH fraction is suitable for crystallizing pLNnH.

In some embodiments, pLNnH may be prepared by other methods, e.g. chemically or enzymatically, and provided in crude, syrupy or amorphous form to be crystallized by the above described methods of the invention.

Other features of the invention will become apparent from the following examples which illustrate the invention but do not limit it.

EXAMPLES

PXRD investigations were conducted with a Philips PW 1710/PW 1820 instrument in transmission geometry, using CuK$\alpha$ radiation made monochromatic by means of a graphite monochromator. D-spacings were calculated from the 2$\Theta$ values, based on a wavelength of 1.54186 Å. As a general rule the 2$\Theta$ values have an error rate of 0.2 Å.

Example 1—pLNnH Polymorph A pLNnH-LNnT mixture was obtained by fermentation followed by its separation from the culture medium as disclosed above, pLNnH was separated from LNnT by gel filtration chromatography.

Its solution in water (BRIX 14.2) was concentrated to a suspension at 70° C. under vacuum (60 mbar) by evaporating the $\frac{5}{6}^{th}$ parts of the water. The suspension was allowed to cool to room temperature while stirred overnight. The solid was filtered, washed with methanol/water (1:1), methanol/water (2:1) and methanol, then dried in a vacuum oven for 27 hours (60° C., 5 mbar). The analysis of the sample showed that the obtained solid was crystalline (see FIG. 1), and contained 7.9% of water (determined by Karl-Fisher titration).

Example 2—pLNnH Polymorph A

A mixture of LNnT and pLNnH (weight ratio is 0.22) in water, obtained by fermentation followed by its separation from the culture medium as disclosed above, was freeze-dried. The resulting solid was taken up in pyridine and the solution was treated with 8 volumes of acetic anhydride at room temperature for 3 days. Volatiles were evaporated, and then co-evaporated twice with toluene. The residue was taken up in ethyl acetate, the organic solution was washed with water, 10% HCl-solution, saturated $NaHCO_3$-solution and brine, dried over $Na_2SO_4$ and concentrated, followed by column chromatography on silica gel (toluene/acetone) to collect the peracetylated pLNnH as a foam. Its $^{13}$C-NMR spectrum is shown in FIG. 2.

The above obtained pLNnH peracetate (1.0 g) was dissolved in THF (10 ml), and cooled to 4° C. Aqueous NaOH-solution (1M, 10 ml) was added slowly to the solution over 15 hours and the reaction mixture was stirred for 79 hours. Further NaOH-solution was added (1M, 1 ml) and the stirring was continued for 24 hours. The excess of base was neutralized with Amberlite IR120 H$^+$, the resin was filtered off and the filtrate was freeze-dried to give an amorphous solid (0.60 g). It was dissolved in water (7.2 ml) and methanol (7.2 ml) was added at 60° C. The heating bath was removed, the mixture was allowed to cool to room temperature and the stirring was continued for 15 hours. The crystals formed were filtered off, washed methanol and dried at 50° C. (0.36 g). Its recorded powder X-ray diffractogram was identical to that of sample of Example 1.

Example 3—pLNnH Polymorph B

A 0.3 M solution of pLNnH in water (3 ml) was heated to 60° C. in an open vial under agitation until complete evaporation of the water (3 days). The solid formed showed a PXRD pattern different than that of polymorph A (see FIG. 2.).

Example 4—pLNnH Polymorph C

Freshly prepared pLNnH polymorph B according to Example 3 was allowed to stay on air at ambient temperature and humidity (5 hours). The obtained solid showed a PXRD pattern different than those of polymorph A or polymorph B (see FIG. 3.).

The invention claimed is:

1. Substantially pure crystalline para-lacto-N-neohexaose (pLNnH).

2. The crystalline pLNnH according to claim 1, wherein the crystalline pLNnH is characterized by a powder X-ray diffraction pattern having peaks at 5.09±0.20, 19.60±0.20 and 20.40±0.20 degrees 2Θ.

3. The crystalline pLNnH according to claim 2, wherein the powder X-ray diffraction pattern further comprises a peak at 19.38±0.20 degrees 2Θ.

4. The crystalline pLNnH according to claim 3, wherein the powder X-ray diffraction pattern further comprises a peak at 7.58±0.20 degrees 2Θ.

5. The crystalline pLNnH according to claim 4, wherein the powder X-ray diffraction pattern further comprises a peak at 7.72±0.20 degrees 2Θ.

6. The crystalline pLNnH according to claim 2, wherein the crystalline pLNnH has a powder X-ray diffractogram that is substantially as depicted in FIG. 1.

7. Crystalline pLNnH characterized by a powder X-ray diffraction pattern having peaks at 19.42±0.20 and 10.07±0.20 degrees 2Θ.

8. The crystalline pLNnH according to claim 7, wherein the powder X-ray diffraction pattern further comprises a peak at 19.88±0.20 degrees 2Θ.

9. The crystalline pLNnH according to claim 8, wherein the powder X-ray diffraction pattern further comprises a peak at 21.25±0.20 degrees 2Θ.

10. The crystalline pLNnH according to claim 9, wherein the powder X-ray diffraction pattern further comprises a peak at 18.88±0.20 degrees 2Θ.

11. The crystalline pLNnH according to claim 7, wherein the crystalline pLNnH has a powder X-ray diffractogram that is substantially as depicted in FIG. 3.

12. Crystalline pLNnH characterized by a powder X-ray diffraction pattern having peaks at 19.55±0.20 and 9.47±0.20 degrees 2Θ.

13. The crystalline pLNnH according to claim 12, wherein the powder X-ray diffraction pattern further comprises a peak at 6.84±0.20 degrees 2Θ.

14. The crystalline pLNnH according to claim 13, wherein the powder X-ray diffraction pattern further comprises a peak at 19.06±0.20 degrees 2Θ.

15. The crystalline pLNnH according to claim 14, wherein the powder X-ray diffraction pattern further comprises a peak at 16.60±0.20 degrees 2Θ.

Figure 4:
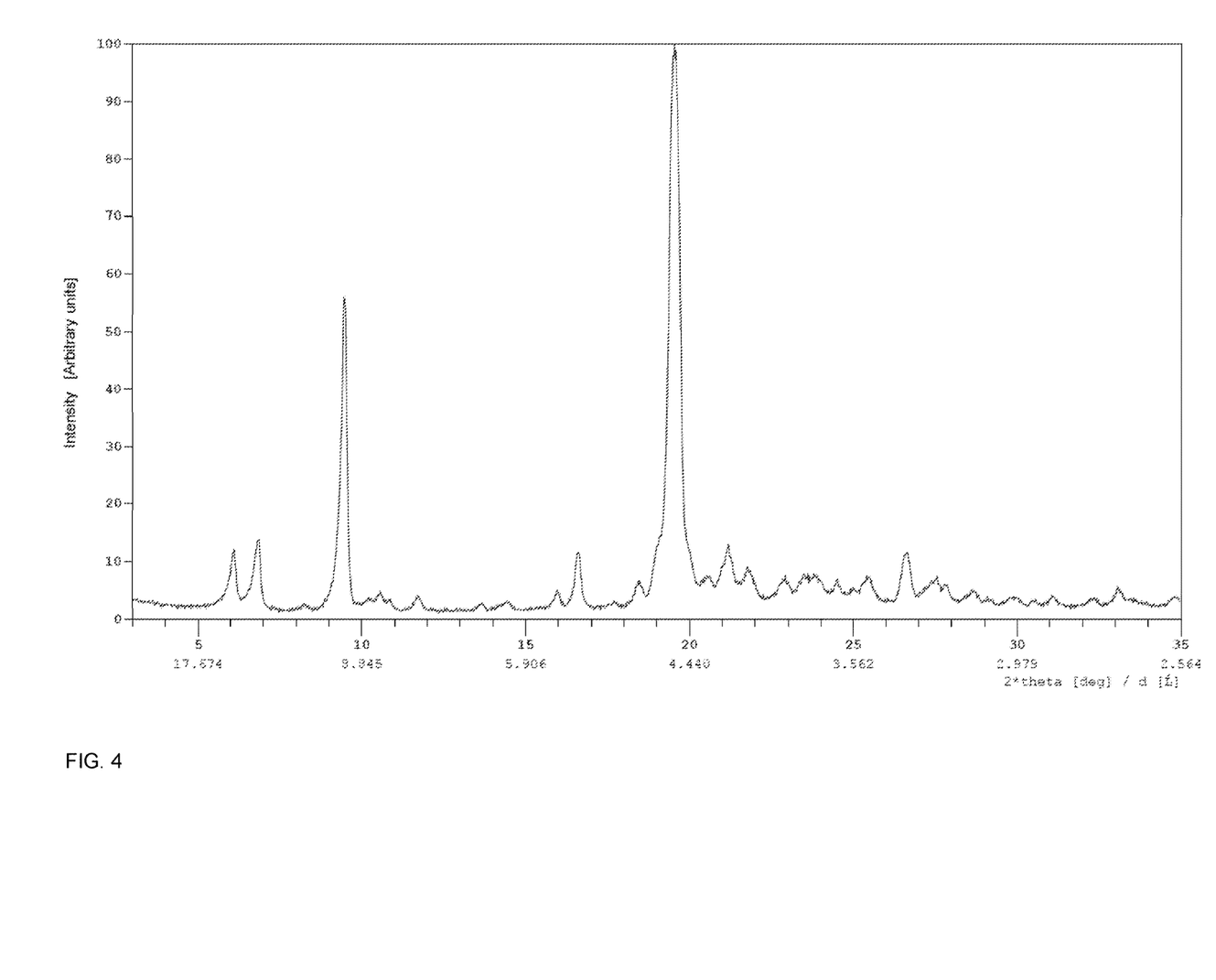
FIG. 4 shows the powder X-ray diffraction pattern of the crystalline pLNnH polymorph C sample obtained according to Example 4.
Figure 5:
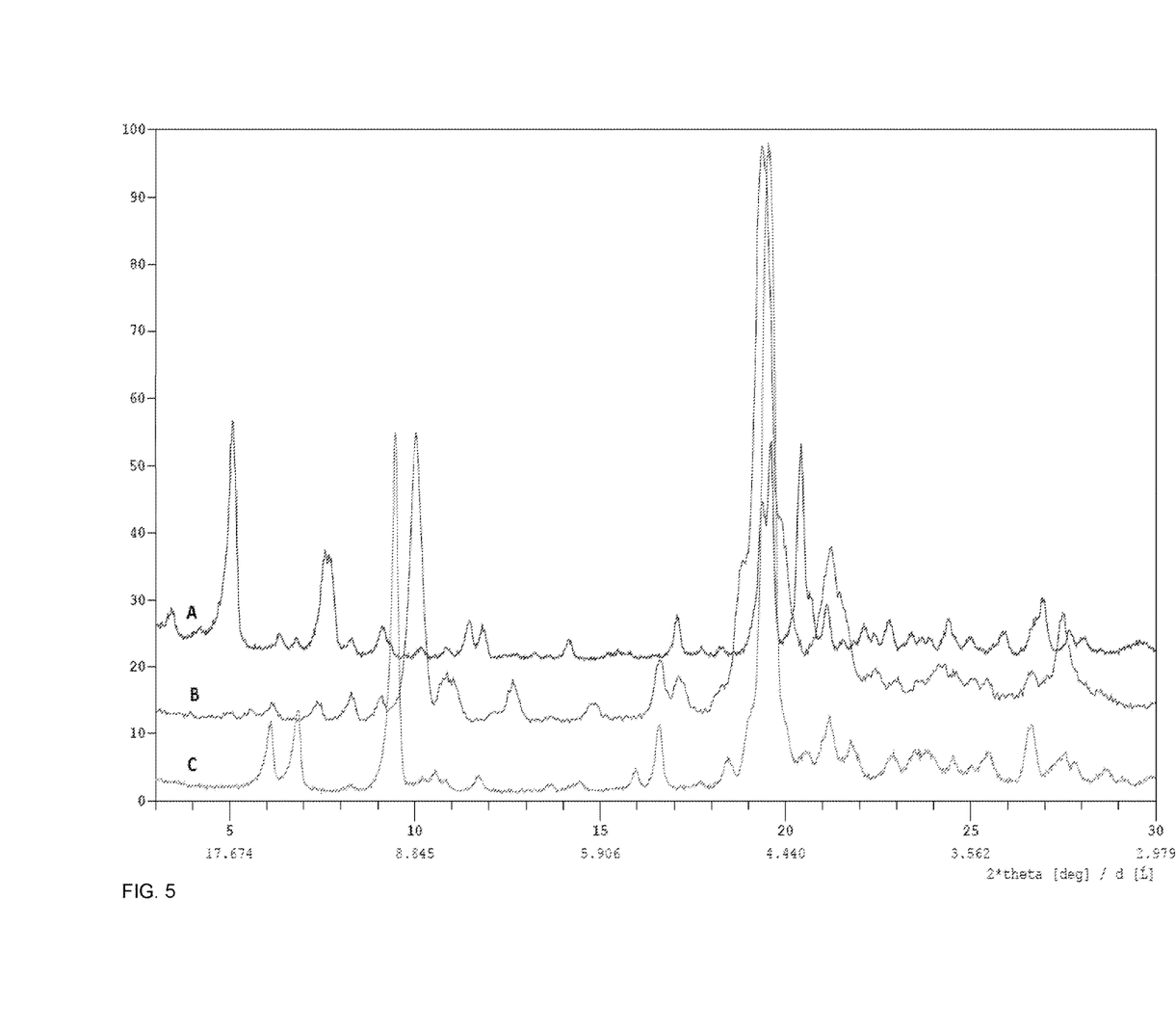
FIG. 5 shows the powder X-ray diffraction patterns of the crystalline pLNnH polymorphs according to the present invention.

16. The crystalline pLNnH according to claim 12, wherein the crystalline pLNnH has a powder X-ray diffractogram that is substantially as depicted in FIG. 4.

17. A pharmaceutical composition comprising the crystalline pLNnH according to claim 1 as an active ingredient.

18. A nutritional composition comprising the crystalline pLNnH according to claim 1.

19. The nutritional composition according to claim 18, wherein the nutritional composition is an infant formula.

20. The nutritional composition according to claim 18, wherein the nutritional composition is a food supplement.

* * * * *